3,190,864
MOULDING COMPOSITIONS OF TETRAFLUORO-
ETHYLENE WITH STABILIZERS TO PREVENT
BLACK SPECKS
Laurence Stanley John Shipp, Stevenage, and Ronald
Philip Smith, Welwyn Garden City, England, assignors
to Imperial Chemical Industries Limited, London, England, a corporation of Great Britain
No Drawing. Filed June 9, 1961, Ser. No. 115,923
Claims priority, application Great Britain, June 22, 1960,
21,850
14 Claims. (Cl. 260—92.1)

This invention relates to moulding compositions and in particular to moulding compositions containing polytetrafluoroethylene.

Polytetrafluoroethylene moulding powder is commonly converted into shaped articles by applying pressure to the powder in a mould, normally at room temperature, to produce a preform and then heating the preform to a temperature of at least 327° C. to sinter the polymer. When the preform are sintered without removing them from their moulds, the resulting shaped articles frequently show an undesirably high proportion of black specks. They may also show an off-white background colour.

An object of the present invention is to provide a polytetrafluoroethylene moulding composition which can be fabricated by any of the normal techniques used with polytetrafluoroethylene into shaped articles in which the formation of black specks is substantially reduced or even eliminated. Another object is to produce a composition which yields shaped articles showing reduced background colour.

Accordingly, we provide a moulding composition comprising polytetrafluoroethylene powder in admixture with from 2 to 200 parts per million parts by weight of said powder of a compound that evolves oxygen when heated at a temperature within the range 100–400° C.

Our invention also includes the production of shaped articles from the said moulding composition and the shaped articles thus produced. Shaped articles produced therefrom are substantially free from black specks even when the preforms have been sintered in their moulds. Shaped articles are most commonly produced from unsintered particles of polytetrafluoroethylene by cold pressing followed by heating the pressed body to above the polymer sintering temperature and our invention is particularly directed to moulding compositions as described above in which the polytetrafluoroethylene powder is present in the unsintered state.

We prefer that thermolabile compound should be present in our moulding composition in an amount less than 100 parts per million parts by weight of the powder since higher amounts may adversely affect the electrical properties of the mouldings. However, higher amounts than 100 parts per million can be employed where the resultant mouldings are for use in applications where electrical properties are unimportant. Normally at least 10 parts per million parts by weight of the powder should be present in order to obtain a substantial benefit from our invention.

The thermolabile compound may be incorporated in the polymer by any convenient method. It is preferably incorporated during the disintegration of the relatively coarse polymer particles which are obtained by the granular polymerisation method. According to this method the polymer particles obtained as a direct result of the polymerisation reaction are agitated in a solution of the themolabile compound in water, which preferably contains a surface-active agent in order that the polymer particles are wetted by the liquid medium, or in a mixture of water and a water-miscible organic liquid, e.g. a lower aliphatic alcohol or ketone, by means of a stirrer fitted with a number of cutting blades, and the disintegrated particles are thereafter freed of solvent at a temperature below the decomposition temperature of the thermolabile compound. The thermolabile compound is thereby incorporated in the polymer particles. This method has the advantage of not requiring an additional processing step compared with the normal procedure for making polytetrafluoroethylene moulding compositions.

Another method is to contact polymer particles which have been distintegrated in water according to normal practice and the water thereafter substantially completely removed, with a solution of the thermolabile compound in a liquid which wets the polymer, and to thereafter remove the solvent at a temperature below the decomposition temperature of the thermolabile compound. Suitable wetting liquids for polytetrafluoroethylene include the lower aliphatic alcohols, such as methanol or ethanol, and ketones, such as acetone. Mixtures of water-miscible wetting liquids with small amounts of water, e.g. up to 33% water by volume may be used instead. Alternatively, the water may contain a surface-active agent in order to wet the polymer particles.

In preparing compositions according to our invention comprising sintered polymer particles we prefer to bring the sintered particles into contact, preferably under conditions of agitation, with a solution of the thermolabile compound in a liquid which wets the polymer, and to thereafter substantially completely remove the solvent at a temperautre below the decomposition temperature of said compound.

Examples of suitable surface-active agents which may be used in practising any of the above-described methods of treating the polymer particles are the water-soluble polyfluoro-alkanoic acids and their water-soluble salts, e.g. alkali metal or ammonium salts such as sodium dodecafluoroheptanoate, potassium hexadecafluoronanoate or ammonium pentadecafluoroctanoate. Alternatively, alkyl phenol/ethylene oxide polycondensates, such as polyethylene glycol mono-p-octyl phenyl ether, or water-soluble salts of sulphuric acid esters of fatty alcohols, such as sodium lauryl sulphate, may be used. The amount of surface-active agent used is not critcial but should in general be such that not more than about 25 p.p.m. by weight are retained on the dry polymer.

Particularly suitable thermolabile compounds that may be used in our invention are those ammonium, alkali metal and alkaline earth metal salts of oxyhalogen acids which decompose with the evolution of oxygen at temperatures within the range 100–400° C. Not only does the presence of these salts result in the substantial elimination of black specks in sintered mouldings produced from polymeric compositions containing them but the mouldings also have an overall white appearance, i.e. they are substantially free from background colour. Sodium nitrate and potassium nitrate also have this advantageous property. In general we prefer that the molecules of the themolabile compound should not contain sulphur atoms as this may adversely affect the overall colour of the sintered mouldings.

We prefer that the thermolabile compound used should not undergo a substantial amount of decomposition at temperatures below 160° C. since it is common practice to dry the wet-disintegrated polymer at temperatures up to about 150° C. for ease and speed of commercial operation. It will be appreciated that when the thermolabile compound is added to the water in which the polymer particles are disintegrated and the water subsequently removed by heating, the said compound would not be present in the dry moulding composition if it decomposed at a lower temperature than the temperature of drying, and the object of our invention would not be achieved. For this reason, hydrogen peroxide which decomposes at temperatures below 100° C. is unsuitable for use in our invention. At the other end of the range, potassium perchlorate is too heat-stable to be used to advantage in our moulding compositions. Specific compounds that may be used in our invention are potassium chlorate, lithium chlorate, strontium chlorate, magnesium perchlorate, potassium bromate, sodium periodate and ammonium periodate, i.e. salts which decompose with evolution of oxygen at 100–400° C., and which are selected from the preferred broad classes of salts useful in our invention, which salts are capable of ionising to form an anion and a cation selected from the following: chlorate, perchlorate, bromate, perbromate, iodate and periodate (anions); and lithium, sodium, potassium, calcium, barium, strontium and magnesium (cations).

The moulding compositions prepared according to any of the above-described methods may be converted into shaped articles by the usual polytetrafluoroethylene fabrication techniques. They may be pressed in a mould, normally at room temperature, to form a preform and the preform sintered, before or after removal from the mould, by heating to a temperature above 327° C., normally between 360 and 400° C. The shaped articles thereby produced may be used in any of the known applications for polytetrafluoroethylene, e.g. as diaphragms, gaskets, and insulating wires and tapes. When compositions according to our invention contain sintered polymer particles they are normally used for extrusion work, e.g. by forcing the powdered composition by means of a ram through an elongated die heated to a temperature above the polymer sintering temperature.

Our invention is illustrated but in no way limited by the following examples.

*Example I*

9 grams of magnesium perchlorate were dissolved in 500 ml. of water and 5 ml. of the resulting solution were added to 45 ml. of ethyl alcohol.

In the meantime a batch of granular polytetrafluorethylene, disintegrated in water and dried for 6 hours at 150° C. in an air-circulating oven was placed on a tray to form a ½ in. thick layer weighing 1862 grams.

The magnesium perchlorate solution was distributed evenly over the surface of the layer of polymer, and the tray and its contents left for 90 mins. in an air-circulating oven at 130° C.

The powder was then pressed in a mould with an annular cavity at room temperature under a pressure of 1 ton/sq. in. and the preform sintered in its mould at 380° C. for 4 hours.

The sintered preform was cooled under pressure to produce a tube 3½ in. O.D., 2 in. I.D. and 2 in. high. No black specks could be detected either on the tube surface or when it was cut into two halves thus exposing fresh surfaces. The tube had an overall white appearance. This was markedly superior to tube made by an identical process from granular polytetrafluoroethylene containing no magnesium perchlorate, which tube had an undesirable off-white appearance and contained numerous black specks. Tape 0.008 in. thick was shaved from the tubes made from treated and untreated polymer and subjected to tensile strength, elongation and electrical breakdown tests. The following results were obtained (figures in parentheses relate to tape made from untreated polymer):

Tensile strength of tape in
  direction of cutting _____ 4180 p.s.i. (4640 p.s.i.)
Elongation at break of tape
  in direction of cutting _____ 310% (240%)
Tensile strength of tape at
  right angles to direction
  of cutting _____ 3040 p.s.i. (3230 p.s.i.)
Elongation at break of tape
  at right angles to direction of cutting _____ 180% (220%)
Number of failures/100
  sq. in. at 100 volts/mil _____ 12 (9)

*Examples II to X*

In the following experiments coarse particles of polytetrafluoroethylene made by a granular polymerisation process were disintegrated in water containing the additives specified in the table below. In each case, 908 g. of filtered, undried polymer from the polymerisation autoclave was added to ten times its weight of demineralised water (containing the specified amounts of additive) in a cylindrical vessel through the top of which was passed a rotatable stirrer from which 6 steel blades having horizontal cutting edges extended in radial directions. The stirrer was rotated at 1600 r.p.m. for 10 minutes and at the end of this time the bulk of the water was removed from the polymer particles by leaving them on a dewatering tray for 10 minutes. (In a series of separate experiments it was found by gravimetric analysis that approximately 15% by weight of the wet polymer after the above treatment consisted of aqueous metal salt solution, and the figures given in the extreme right-hand column in the table were obtained on that basis. The actual amounts of salt deposited on the polymer were measured in each case and found to agree with the calculated values to within ±5%.) The wet polymer from the dewatering tray was then dried for 6 hours at 150° C. in an air-circulating oven.

| Example | Additives | | Weight of additive in grams | Calculated p.p.m. of metal salt on dry polymer weight |
|---|---|---|---|---|
| | Metal salt | Surface-active agent | | |
| II | $KClO_3$ | | 2.5 | 50 |
| III | $KClO_3$ | Ammonium pentadecafluorooctanoate. | 2.5 / 0.5 | 50 |
| IV | $KClO_3$ | Polyethylene glycol mono-p-octyl phynyl ether.[a] | 2.5 / 0.5 | 50 |
| V | $Mg(ClO_4)_2$ | ___do___ | 1.7 / 0.5 | 33 |
| VI | $Mg(ClO_4)_2$ | | 2.5 | 50 |
| VII | $Mg(ClO_4)_2$ | | 5.0 | 100 |
| VIII | $Mg(ClO_4)_2$ | | 7.5 | 150 |
| IX | $Mg(ClO_4)_2$ | Ammonium pentadecafluorooctanoate. | 5.0 / 0.5 | 100 |
| X | $Mg(ClO_4)_2$ | ___do___ | 2.5 / 0.5 | 50 |

[a] Added in the form of a 33⅓% aqueous solution.

Using the technique outlined in Example I, tape was produced for mouldings prepared from each batch of dry polymer composition and tensile strength figures of from 4,120 to 4,490 p.s.i. (in the direction of cutting) and from 3,040 to 3,170 p.s.i. (at right angles to the direction of cutting) were measured. In no single case could any black specks be detected on the surface of the moulding or on the new surfaces exposed by cutting the moulding in half.

*Example XI*

This example illustrates the addition of oxidizing agent to sintered polymer.

Coarse polymer particles made by the granular polymerisation of tetrafluoroethylene were filtered and thereafter disintegrated while suspended in demineralised water contained in the cylindrical disintegrator used in the above examples. The disintegrated particles were dried at 150° C. for 6 hours in an air-circulating oven. The dried particles were placed in a thin layer on a stainless steel tray and heated for 3 hours at 380° C. The resulting cake-like mass was then disintegrated in a Christie Norris mill and 454 grams of the milled particles were agitated in 25 ml. of a solution prepared by dissolving 1 g. of magnesium perchlorate and 0.05 g. of ammonium pentadecafluorooctanoate in 1000 ml. of water. The resulting mass was transferred to a stainless steel tray and dried for 6 hours at 150° C. in an air-circulating oven. The dried particles were extruded into a rod of 5/16 in. diameter by forcing them by means of a ram through an elongated die heated to 380–440° C. The rod, after cooling to room temperature, was completely free from black speck contamination and had an overall white appearance, whereas rod made from untreated polymer was very much inferior in both these respects. The rod made from treated polymer had a tensile strength in the machine direction of 1,410 p.s.i.

We claim:

1. A moulding composition comprising polytetrafluoroethylene powder in admixture with from 2 to 200 parts per million parts by weight of said powder of a compound that is a stabilizer which prevents the formation of black specks when a preform of said powder is heated to sinter it at a temperature of at least 327° C. and that evolves oxygen when heated at a temperature within range 100–400° C., said compound being selected from the group consisting of ammonium, alkali metal and alkaline earth metal salts of chloric, perchloric, bromic, perbromic, iodic and periodic acids.

2. A moulding composition according to claim 1 in which said compound is present in amount less than 10 parts per million parts by weight of said powder.

3. A moulding composition according to claim 1 in which said compound is present in an amount of at least 100 parts per million parts by weight of said powder.

4. A moulding composition according to claim 1 wherein the polytetrafluoroethylene powder is unsintered.

5. A moulding composition according to claim 1 wherein said compound is magnesium perchorlate.

6. A moulding composition according to claim 1 wherein said compound is potassium chlorate.

7. A process according to claim 12 wherein said solution contains a surface-active agent.

8. A process according to claim 7 wherein the surface-active agent is selected from the group consisting of water-soluble polyfluoro-alkanoic acid and a water-soluble salt thereof.

9. A process according to claim 7 wherein the surface-active agent is an alkyl phenol/ethylene oxide polycondensate.

10. A process according to claim 13 wherein said liquid comprises a member of the group consisting of lower aliphatic alcohol and ketone.

11. A process according to claim 13 wherein said liquid comprises water containing a surface-active agent.

12. A process for the production, from the immediate product of a granular process for polymerizing tetrafluoroethylene, of a moulding composition according to claim 1 which comprises agitating the particles of granular polytetrafluoroethylene obtained from the said polymerization process in a solution of the said compound in water by means of a stirrer having a number of cutting blades, thereby simultaneously disintegrating the said particles of granular polytetrafluoroethylene and incorporating the said compound into the particles of polytetrafluoroethylene, and thereafter removing the solvent at a temperature below the decomposition temperature of said compound.

13. A process for the production, from the product of a granular process for polymerizing tetrafluoroethylene, of a moulding composition according to claim 1 which comprises disintegrating the particles of granular polytetrafluoroethylene which are the immediate products of the said polymerization process, contacting the disintegrated particles with a solution of said compound in a liquid which wets the said disintegrated particles and thereafter removing the solvent at a temperature below the decomposition temperature of said compounds.

14. A method of making a shaped polytetrafluoroethylene article which comprises forming a shaped body from the composition of claim 1 and sintering the said body by heating it to a temperature between about 327° C. and 400° C.

References Cited by the Examiner
UNITED STATES PATENTS

| 2,593,583 | 4/52 | Lontz | 260—92.1 |
| 2,643,988 | 6/53 | Walter | 260—45.75 |
| 2,718,452 | 9/55 | Lontz | 260—92.1 |
| 2,907,742 | 10/59 | Fry et al. | 260—45.7 |
| 2,976,257 | 3/61 | Dawe et al. | 260—14 |
| 2,997,448 | 8/61 | Hochberg | 260—2.5 |

JOSEPH L. SCHOFER, Primary Examiner.

H. N. BURSTEIN, J. R. LIBERMAN, WILLIAM H. SHORT, Examiners.